Figure 1:
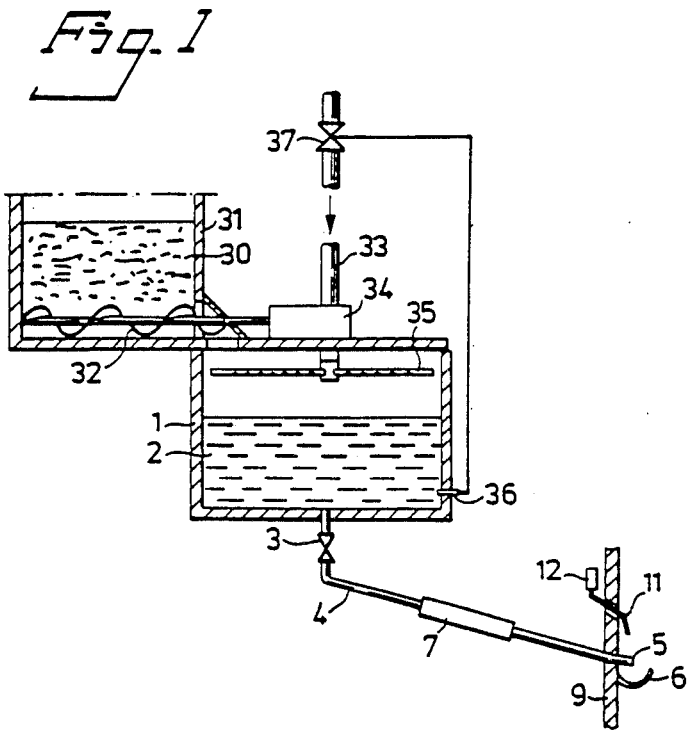

United States Patent [19]

Smeds

[11] Patent Number: 4,653,432
[45] Date of Patent: Mar. 31, 1987

[54] NUTRIENT DISPENSER

[76] Inventor: Stig-Eric Smeds, Aldersbo, S-730 73 Ransta, Sweden

[21] Appl. No.: 822,424
[22] PCT Filed: Mar. 28, 1985
[86] PCT No.: PCT/SE85/00141
§ 371 Date: Nov. 27, 1985
§ 102(e) Date: Nov. 27, 1985
[87] PCT Pub. No.: WO85/04305
PCT Pub. Date: Oct. 10, 1985

[30] Foreign Application Priority Data

Mar. 28, 1984 [SE] Sweden .................... 8401723

[51] Int. Cl.⁴ .............................. A01K 9/00
[52] U.S. Cl. ..................................... 119/71
[58] Field of Search ............................ 119/71

[56] References Cited
U.S. PATENT DOCUMENTS 3,090,355 5/1963 Gains .................... 119/71
3,425,398 2/1969 Buffy et al. ............... 119/71 X
3,525,315 8/1970 Lange .................... 119/71

Primary Examiner—Hugh R. Chamblee
Attorney, Agent, or Firm—Oblon, Fisher, Spivak, McClelland & Maier

[57] ABSTRACT

A nutrient dispenser for supplying nutrient liquid to young animals includes a container (1) in which the liquid (2) is kept cool. Feeding the liquid is done via a solenoid valve (3) which is activated by the animal with the aid of an activating means (11, 12). The feed pipe (4) leading from the solenoid valve to the animal box has a heating element (7) which continuously keep the pipe warm and gives the fed-out nutrient liquid a temperature suitable for the animal. To avoid long storage of ready-mixed nutrient liquid, the container (1) may be formed with a store (31) intended for dry substance (30). The dry substance is fed to the container with the aid of a conveyor (32) driven by the amount of water (via 33, 34) predetermined for filling the container.

8 Claims, 2 Drawing Figures

U.S. Patent  Mar. 31, 1987  4,653,432

NUTRIENT DISPENSER

DESCRIPTION

1. Technical Field

The present invention relates to a nutrient dispenser for supplying a nutrient liquid to young animals such as calves or piglets. For this purpose the dispenser includes a container for the nutrient liquid, which is adapted for metering to one or more teat-like feed means accessible to the animals via one or more feed pipes.

2. Background Art

Such nutrient dispensers are used for achieving as early weaning as possible for the young animals. A known dispenser of this kind, see. e.g. French specification No. 1 536 924, has a container in which the nutrient liquid, which is milk powder dissolved in water, is kept ready-mixed and heated to a suitable temperature for the animals to drink. The container is filled with milk powder twice a day, and water is added. Feeding out the warmed milk takes place at a predetermined feed rate to the trough, where the animals thus obtain access to warm milk substitute.

The disadvantages with these known apparatus is that the nutrient liquid/milk is kept ready-mixed and is kept warm in the container. This means increased risks of the animals getting nutrient liquid with a high bacteria content or otherwise deteriorated quality. Furthermore, the nutrient liquid remains the whole time in the feed pipes taking the liquid from the container to the trough. The nutrient liquid also cools in conveyance from the container, and this is also the case with remaining liquid in the feed pipes and trough. Thus the risks are increased to an even greater degree that the nutrient liquid consumed by the animal has cooled and/or is of poor quality or in poor condition at the time of consumption which may lead to severe consequences for the animals.

DISCLOSURE OF INVENTION

The nutrient dispense in accordance with the invention surmounts these difficulties by the container, and the nutrient liquid therein being cooled, e.g. to about 10° C., in that the feed valve is arranged in the respective feed pipe immediately adjacent the container and is controlled from an activator being actuated by the animal for feeding nutrient liquid through the feed pipe only during the time when the activator is activated. Each feed pipe is implemented with a heating element controlled by a thermistor for continuously keeping the pipe warm. The warm pipe will then warm up the nutrient liquid fed through it.

In a preferred embodiment of the nutrient dispenser being used for milk substitute, the container comprises separate stores for the nutrient components involved in the ready made milk substitute to avoid that too large amounts of ready-mixed nutrient liquid in the form of milk substitute, must be stored in the container. The dispenser in accordance with the invention can to advantage be implemented with a controlled supply of the nutrient components which are to be included in the nutrient liquid. The container of the dispenser is thus connected via a conveying means to a store intended for milk powder, the means being driven by the amount of water required for a desired milk mixture to be obtained in the container.

The amount of milk powder per unit of water is thereby adjustable by regulating the speed of the conveying means driven by the water. By using the water which controls or activates the advance of milk powder the risk is avoided of overdosing milk powder, i.e. the risk for obtaining too rich a milk substitute in the container is avoided.

With a container which may be readily lifted off, the dispenser in accordance with the invention can have its component parts readily accessible, in its components parts, e.g. for cleaning or possible repairs.

The inventive nutrient dispenser thus meets very high demands for absolute functional reliability and hygien. The animals which are fed get precisely the amount of nutrient liquid they desire for the moment. No waste or excess liquid remains in the supply pipes, whereby any risk for sour or otherwise poor nutrient liquid is avoided. Contributing to this is also that the less quantity of liquid kept ready-mixed in the container is cooled and that new nutrient liquid is mixed when the liquid level in the container has dropped to a predetermined height.

PREFERRED EMBODIMENT

Figure 2:
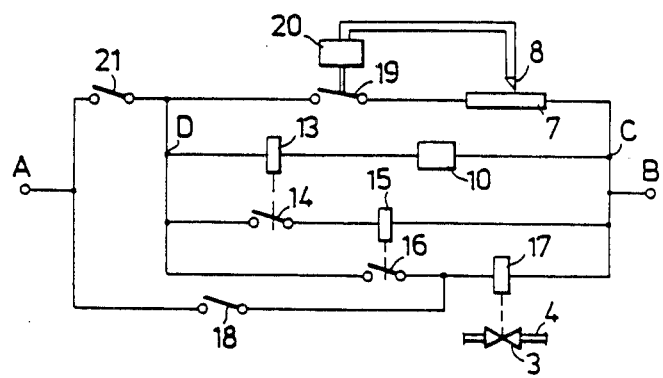

The inventive nutrient dispenser will now be described in detail with reference to the accompanying drawing, where FIG. 1 illustrates the principle of a preferred embodiment of the dispenser and FIG. 2 is an electrical wiring diagram for the automatic liquid feed of the nutrient dispenser.

In FIG. 1 there is schematically illustrated the principle of a preferred embodiment of the nutrient dispenser in accordance with the invention. This dispenser includes a container 1 for storing milk 2 at approximately 10° C. The container 1 is connected to a feed pipe 4 by a solenoid valve 3, the pipe being terminated by feed means 5 intended for an animal. This feed means may be teat-shaped and intended for such as a calf or piglet, so that the animal can suckle directly, or the means may be a pipe end opening out into a trough 6. The pipe 4 is implemented with a heating element 7, the heating effect of which is regulated with the aid of a thermistor 8 (FIG. 2). Heat propagation is thus adjusted so that the nutrient liquid fed out at the time of consumption has a temperature of about 37° C. When the solenoid valve 3 is closed the feed pipe 4 is empty and the supplied heat keeps the pipe 4 dry.

The teat-like feed means 5 are arranged in a box intended for one or more animals, a wall 9 of the box being illustrated in FIG. 1. The feed means 5 may be adapted for coacting with a so-called touch-switch 10 (FIG. 2) activated by the animal. Alternatively, this switch can have the form of a mechanical lever 11 arranged so that when the animal activates the lever, a touch-free switch 12 then being caused to close. The touch switch 10 or switch 12 are included in a current circuit for activating the solenoid valve 3.

The current circuit mentioned above can be formed according to the wiring diagram illustrated in FIG. 2. The circuit is supplied from a voltage source A, B which may be of desired type but preferably is of a low voltage type. As mentioned above, the solenoid valve 3 is regulated, and thereby the liquid supply through the supply pipe 5, by such as the touch switch 10. This switch 10 activates an auxiliary relay 13, the contact 14 of which may be disposed in an activation circuit for a time relay 15. The relay contact 16 of the time relay 15 is included in the activation circuit of the solenoid valve 3, an activation coil 17 thus controlling the valve 3.

This current circuit with an auxiliary relay 13 and a time relay 15 means that when the animal activates the touch switch 10 nutrient liquid is fed from the solenoid valve 3 during a period determined by the setting of the time relay 15, which may be adjusted to give different lengths of time.

It is, of course, possible to exclude the time relay 15 and let the auxiliary relay 13 act directly on the relay contact 16. Theoretically, both the auxiliary and time relays 13 and 15 could be excluded, and the activation coil 17 arranged directly in the branch C-D of the touch switch 10. Both latter alternative embodiments are suitable when the feed means 5 (FIG. 1) is teat-like, and thus intended to come in direct contact with the animal when it desires to suckle. In this case the touch switch 10 is, to advantage, arranged directly on the feed means 5.

The activation coil 17 of the solenoid valve 3 is also manually actuable by the manual switch 18, which is preferably of the monostable type with breaking neutral state. The function of the solenoid valve 3 can thus be controlled by this switch 18 and bring, inter alia, the manual operation to come into use when cleaning the nutrient dispenser.

The heating element 7 described in conjunction with FIG. 1 is also connected to the voltage source A, B. The element 7 is coupled in series with a switch 19 which is regulated by a thermostat 20, to which the thermistor 8 is associated. The thermostat 20 holds the switch 19 in the "on" position until the element 7 reaches a predetermined temperature, which is preferably adjustable. When the element 7 has once again cooled to a preferably adjustable, lower, predetermined temperature, the termistor 8 and thermostat 20 actuate the contact 19 for switching on the heating element 7.

Current supply to the current circuit is switched on and off with the aid of a switch 21, which may be automatic.

It will be seen from FIG. 1 that the container 1 is supplemented by a means for supplying water and dry substance 30 to provide the nutrient liquid/milk 2 stored in the container 1. For effectively avoiding the problems associated with the storage of such a liquid product of the kind in question, it is namely suitable to limit the amount of ready-mixed nutrient liquid 2 available at any time. If the liquid 2, as in this example, is a milk substitute, mixture of milk powder 30 and water takes place to provide the final product. As will be seen from the schematically depicted nutrient dispenser in FIG. 1, the milk powder is stored in a store 31 where the temperature and air humidity is kept low. A conveyor 32 is adapted for supplying a predetermined amount of milk powder 30 from the store to the container 1 as required. The operation of the conveyor 32 is dependent on the amount of water which is to be included in the liquid 2. Water is thus fed via the pipe 33 to a driving means 34 for the conveyor 32, which is here illustrated as a screw conveyor. After having passed the driving means 34, the water is fed into the container 1 via a feed device 35 which ensures that supplied milk powder 30 and water are well mixed with each other.

When the milk substitute 2 stored in the container 1 begins to come to an end, and arrives at a predetermined bottom level, this is sensed by a detector 36. The detector, which may be electronic or mechanical, sends a signal to a valve 37 in the pipe 33. The valve 37 is adapted to allow, on activation, the supply of a predetermined and possibly adjustable amount of water. The water passes through the drive means 34 driving the conveyor 32 which in turn supplies a quantity of milk powder 30 from the store 31 corresponding to the amount of water. The amount of milk powder per unit water may be adjusted by regulating the speed of the drive means 34. There is thus no risk of overdosing the milk powder.

As will be seen from the principle described above for the nutrient dispenser in accordance with the invention, it meets high demands for hygiene and safety reliability. Since the container 1 as well as the store 31 may be readily separated from each other and from the solenoid valve 3 of the dispenser, the different components of the dispenser are easily accessible for cleaning and possible repairs.

Even though certain components are described and illustrated as special elements, they may be naturally exchanged for ones of equal value without departing from the inventive concept. For example, the valves 3 and 37 may be solenoid valves, but may also be mechanical or be operable in some other way. The conveyor 31 may be of any suitable kind, although a screw conveyor has been illustrated for the purposes of exemplification. The container 1 is, of course, suitabley formed as a central unit for several, e.g. four feed pipes 4. In such a case each pipe 4 is assigned a separate solenoid valve 3, heating element 7 and feed means 5 together with a current circuit such as the one illustrated in FIG. 2. The invention must therefore not be regarded as confined to what has been exemplified by the description above and on the drawing but only by the following claims.

I claim:

1. A nutrient dispenser intended for the supply of nutrient liquid (2) to young animals, and including a container (1) for the liquid (2), which is arranged for being metered with the aid of a feed valve (3) via one or more feed pipes (4) to one or more teat-like feed means (5) accessible to the animals, characterized in that the container (1) is adapted to keep the liquid (2) cool, and by the combination that the feed valve (3) is arranged in the respective feed pipe (4) immediately adjacent the container (1) and is controlled from an activator (5, 10, 11, 12) actuated by the animal for feeding nutrient liquid (2) through said feed pipe (4) only when the activator (5, 10, 11, 12) is activated, and the respective feed pipe (4) thus having a heating element (7) controlled by a thermistor (8), the element being coupled as to continuously keep the temperature of the feed pipe at a value resulting in that the liquid is sufficiently warm on being fed out and that the pipe is also dried after the liquid has been fed out.

2. Dispenser as claimed in claim 1, and where the nutrient liquid (2) is milk substitute, characterized in that the container (1) includes a store (31) having a conveyor means (32) intended for the milk powder (30) and arranged for being driven in response to the amount of water (via 34) with which the powder is to be mixed for obtaining the milk substitute, the water supply being arranged for regulation by a detector (36) sensing the level of the milk substitute in the container.

3. Dispenser as claimed in claim 2, characterized in that the amount of milk powder (30) per unit of water is adjustable by regulating the speed of the conveyor means (32) operated by the water.

4. Dispenser as claimed in claim 1, characterized in that the activator (5, 11, 12) includes a touchfree switch

(12) arranged for actuation with the aid of a lever (11) activated by the animals.

5. Dispenser as claimed in claim 1, characterized in that the activator (5, 10) includes an electronic switch directly actuated by the animal and formed as, or in conjunction with said teat-like feed means (5) terminating the feed pipe (4).

6. Dispenser as claimed in claim 5, characterized in that the feed valve (3) is formed as a solenoid valve controlled by the activator (5, 10, 11, 12).

7. Dispenser as claimed in claims 1, characterized in that the container (1) may be connected to four feed pipes (4) via their individual feed valves (3), which are controlled from the activator (5, 10, 11, 12) disposed at the delivery end of the respective feed pipe.

8. Dispenser as claimed in claim 1, characterized in that the container (1) may be lifted off from its connection to the feed pipe or pipes (4) via the respective feed valve (3).

* * * * *